United States Patent [19]

Giubbolini et al.

[11] Patent Number: 4,523,291
[45] Date of Patent: Jun. 11, 1985

[54] DEVICE FOR ESTIMATING THE OPERATING FREQUENCY OF A SOURCE OF RECURRENT SIGNALS

[75] Inventors: Marco Giubbolini; Walter Marziali, both of Rome, Italy

[73] Assignee: Selenia-Industrie Elettroniche Associate S.p.A., Rome, Italy

[21] Appl. No.: 391,869

[22] Filed: Jun. 24, 1982

[30] Foreign Application Priority Data

Jun. 25, 1981 [IT] Italy ............................... 48762 A/81

[51] Int. Cl.³ ..................... G06F 15/31; G01R 23/16
[52] U.S. Cl. .................................... 364/724; 364/485
[58] Field of Search ............... 364/724, 726, 484, 485; 343/5 FT, 5 SA; 324/77 B, 78 F; 179/84 VF

[56] References Cited

U.S. PATENT DOCUMENTS

| | | | |
|---|---|---|---|
| 3,803,390 | 4/1974 | Schaepman | 364/724 |
| 3,989,938 | 11/1976 | Auth | 364/498 |
| 4,093,989 | 6/1978 | Flink et al. | 364/485 |
| 4,188,628 | 2/1980 | Langeraar et al. | 343/5 SA |
| 4,234,880 | 11/1980 | Klemm | 343/5 FT |
| 4,301,404 | 11/1981 | Ley | 324/77 B |
| 4,321,680 | 3/1982 | Bertrand et al. | 364/485 |
| 4,408,284 | 10/1983 | Kijesky et al. | 364/485 |

Primary Examiner—David H. Malzahn
Attorney, Agent, or Firm—Karl F. Ross; Herbert Dubno

[57] ABSTRACT

A device for estimating the scanning frequency of an unfriendly tracking radar of the conically scanning type comprises input circuitry for eliminating the d-c component of a detected radar signal and a sampler deriving a train of amplitude pulses from that signal which, after digitization, are fed to a calculator performing a Fourier analysis thereon. The index of the term of the resulting Fourier series with the largest sum of the absolute values of its real and imaginary coefficients is selected and weighted with a corrective factor obtained from the numerical values of the coefficients of a limited number of preceding and succeeding terms in the series; the corrected index yields the estimated scanning frequency.

4 Claims, 2 Drawing Figures

DEVICE FOR ESTIMATING THE OPERATING FREQUENCY OF A SOURCE OF RECURRENT SIGNALS

FIELD OF THE INVENTION

Our present invention relates to a device for estimating the operating frequency of a source of recurrent incident signals, especially the scanning frequency of a tracking radar of the conically scanning type located at an unfriendly station and aimed at a target to be protected therefrom.

BACKGROUND OF THE INVENTION

Countermeasure systems designed to make a target virtually invisible to an unfriendly tracking radar must include means for ascertaining the scanning frequency $f_s$ of that radar with a high degree of accuracy. Passive systems of this type merely serve to detect and measure the characteristic parameters of radars operating in the environment whereas active systems utilize that information for the purpose of sending out interfering signals effective to divert the radar beam from its target. Such active systems may be mounted, for example, on platforms aboard ships or aircrafts intended to elude detection.

The frequency $f_s$ of a conically scanning tracking radar generally lies in a range of roughly 30 to 300 Hz. In order to estimate its actual value, within tolerance limits of 1 Hz, a passive circuit arrangement may comprise a multiplicity of phase-locking loops (PLL) tuned to respective discrete frequencies within the aforementioned range. A circuit arrangement of this description, code-named "SERO", is used in the SELENIA INS-3 system of our assignee, Selenia Industrie Elettroniche Associate S.p.A.; in that system the lowest PLL frequency latched onto the detected radar signal is taken as the wanted scanning frequency $f_s$ in order to exclude its higher harmonics. Such a circuit arrangement limits the maximum RMS error, which varies with the measured frequency, to a value between 1 and 2 Hz.

Active systems of the so-called "inverse gain" type, such as those code-named SL/ALQ 234 and 238, emit an interfering signal whose frequency should match the carrier frequency of the radar signal, with a deviation less than the bandwidth of the servo system of the radar antenna, and which is modulated in amplitude with an envelope in phase opposition to that of the incident carrier. The carrier frequency of the emitted interfering signal is progressively varied until its disturbing effect upon the radar signal has resulted in a disalignment of the tracking beam from the target as determined from a significant increase in the depth of modulation of the detected signal. The rate of change in the emitted carrier frequency must be slow enough, generally on the order of 0.5 Hz/sec, to induce an appreciable pointing error in the operation of the tracking radar. However, the neutralization of that radar ought to be accomplished in a relatively short time, usually of about 10 seconds, so that the frequency sweep can cover a band of only a few Hz in the available interval.

Thus, the PLL circuitry referred to above can be used without any prior knowledge of the scanning frequency $f_s$ whereas the inverse-gain system will be effective only when the scanning frequency is known to lie within a relatively narrow band of about 4 to 5 Hz.

OBJECT OF THE INVENTION

The object of our present invention is to provide a frequency estimator for the purpose described which is more compact than the above-discussed PLL circuitry and is effective over the entire range of possible signal frequencies in reliably predicting the value of $f_s$ with a high degree of accuracy.

SUMMARY OF THE INVENTION

A device according to our invention, designed to realize this object, comprises input circuitry including filter means for isolating an a-c component of an incident signal such as that of a tracking beam incident upon a target being scanned. This input circuitry is connected to sampling means deriving from that a-c component, referred to hereinafter as the useful signal, a sequence of amplitude pulses of predetermined cadence corresponding to twice the presumed maximum operating frequency of the source emitting the incident signal; this cadence, accordingly, will be on the order of 600 Hz in the case of a tracking radar whose scanning frequency $f_s$ is assumed to lie within a range of about 30 to 300 Hz. The sequence of amplitude pulses thus generated, digitized by conversion means connected to the sampling means, is fed to arithmetic means subjecting that sequence to a Fourier analysis and calculating an estimated operating frequency $\hat{f}_s$ from the index of a selected term in the resulting Fourier series, namely the term whose real and imaginary coefficients have absolute values adding up to the highest numerical value in the series.

According to a more particular feature of our invention, the index of the selected term is weighted in a calculating stage of the arithmetic means with a corrective value derived from averaged differences between the Fourier coefficients of a limited number of terms immediately preceding and succeeding the selected term in the series.

The input circuitry of our improved estimator may comprise a sample-and-hold circuit which receives and filters the incident radar signal and is followed by two downstream filters in parallel with each other, namely a low-pass filter and a direct-current extractor. A subtractor connected to the outputs of these two downstream filters eliminates the d-c component from the signals transmitted by the low-pass filter which cuts off all signal frequencies above the presumed maximum operating frequency, i.e. frequencies exceeding the upper range limit of about 300 Hz in the specific case of a conically scanning tracking radar.

BRIEF DESCRIPTION OF THE DRAWING

The above and other features of our invention will now be described in detail with reference to the accompanying drawing in which:

FIG. 2 is a graph showing the statistical variation of the standard deviation of the frequency estimate with different numbers of Fourier terms used for establishing the corrective value referred to.

SPECIFIC DESCRIPTION

Figure 1:
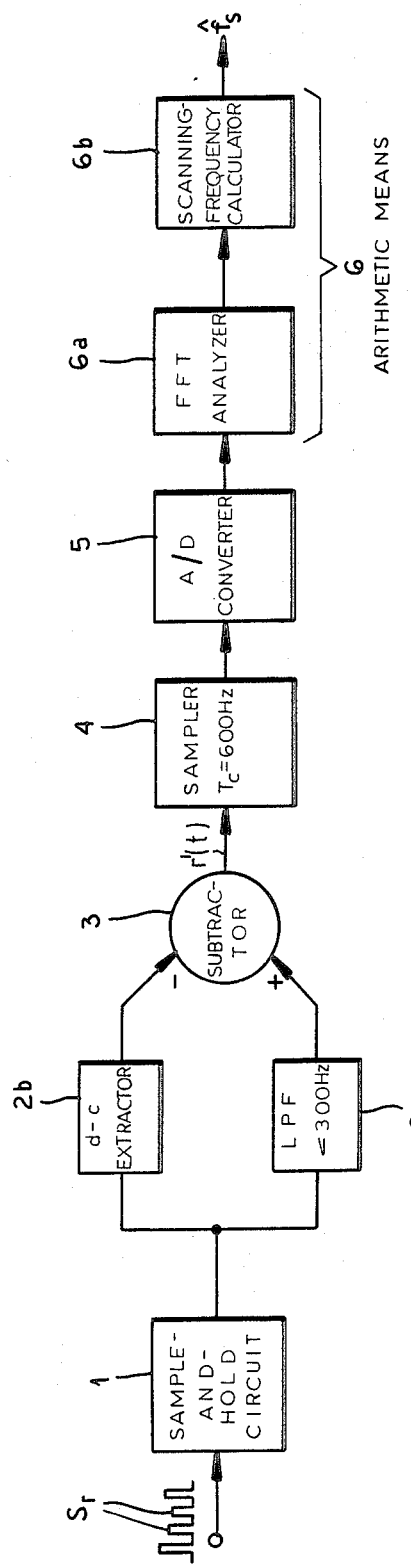
FIG. 1 is a block diagram of a scanning-frequency estimator embodying our invention.

As shown in FIG. 1, a scanning-frequency estimator according to our invention comprises a conventional sample-and-hold circuit 1 which receives and filters an incident radar signal $S_r$ in the form of a train of amplitude-modulated pulses. These pulses, impinging upon an associated target, are assumed to originate at an unfriendly tracking radar operating with a conical scan whose periodicity constitutes the fundamental frequency of the modulating envelope. The signal $S_r$ is fed in parallel to two filters 2a and 2b downstream of circuit 1, i.e. a low-pass filter 2a cutting off signal frequencies above 300 Hz and a zero-frequency filter 2b serving as a d-c extractor. The output voltages of the two filters are differentially combined in a subtractor 3 which eliminates the d-c component from the alternating signal passed by filter 2a. A useful signal $r'(t)$ appearing in the output of subtractor 3 is then fed to a sampler 4 operating at a cadence $T_c = 600$ Hz, sufficient to detect oscillations up to the upper range limit of 300 Hz, to produce a sequence of amplitude pulses. In the specific instance here considered, this sequence contains a number $N = 2^9 = 512$ samples occurring in an interval of about 0.85 sec. The amplitude pulses issuing from sampler 4 are digitized in an analog/digital converter 5 and are then fed to an arithmetic unit 6 which includes an analyzing stage 6a, subjecting the digitized pulse sequence to a fast Fourier transformation (FFT), and a calculating stage 6b deriving an estimated scanning frequency $\hat{f}_s$ from the resulting Fourier series. The signal-to-noise ratio at the input of sampler 4 will be about 2.57 dB under the most unfavorable operating conditions.

The FFT algorithm utilized by analyzer 6a may be of parallelized base-4 type, suitable for multiprogramming, and produces a series of discrete terms of the well-known form $(\alpha_{r1} + \alpha_{i1}) \cos \omega_1 + (\alpha_{r2} + \alpha_{i2}) \cos \omega_2 + \ldots + (\alpha_{rn} + \alpha_{in}) \cos \omega_n + \ldots$, with the index $n_{max}$ of the highest-order term equal to $N/2 = 256$. The 256 pulsatances $\omega_1$, $\omega_2$ etc. represent frequencies $f_n = n/N \cdot T_c$ spaced 1 Hz apart, ranging from 30 to 285 Hz. The subscripts r and i of the associated coefficients respectively designate them as real and imaginary. Thus, analyzer 6a stores a total of 512 coefficients $\alpha$ relating to 256 spectral lines $\omega$.

Calculator 6b sums the absolute values of the real and imaginary coefficients of each spectral line to produce a set of values $b_1, b_2, \ldots b_n, \ldots b_{256}$. The calculator then compares these values to find the highest sum $b_K$ pertaining to the $K^{th}$ spectral line. Without a corrective weighting, the index K of the term so selected would yield an estimated scanning frequency equal to $K/N \cdot T_c$.

We have found, however, that the useful signal $r'(t)$ in many instances is not a sine wave of constant amplitude and phase throughout the measurement period but that these parameters may fluctuate, by what is known in the art as "glint", on account of variations in the effective cross-sectional area of the target as seen by the radar. Furthermore, there is superimposed upon this useful signal a component of thermally generated so-called white noise which may be considered as having a substantially constant spectral density throughout the frequency band of interest. Filtering stage 1 may be a source of error since an incoming radar pulse could be suppressed by a delayed opening or a premature closure of its sampling gate due to a misreading of the pulse rate. Finally, there is a possibility in regions of high traffic density that spurious pulses from other radars may be superimposed upon those detected by the input stage 1.

For all these reasons we prefer to supplement the selected index K with a corrective value $\delta$ so that the estimated scanning frequency determined by calculator 6b will be given by $$\hat{f}_s = \frac{K + \delta}{N \cdot T_c}. \tag{I}$$

The corrective value $\delta$ is calculated in stage 6a according to the formula $$\frac{\sum_{m=1}^{M} [b_m - b_{(-m)}] \cdot m}{\sum_{m=1}^{M} [b_m - b_{(-m)}]} \tag{II}$$

where M represents the maximum number of terms in the Fourier series on either side of the selected term of maximum sum by whose parameters $b_m$, $b_{(-m)}$ are given by $b_m = |\alpha_{rm}| + |\alpha_{im}|$ and $b_{(-m)} = |\alpha_{r(-m)}| + |\alpha_{i(-m)}|$. The negative index $(-m)$ refers to terms preceding the selected term of index K in the series, i.e. to spectral lines of lower frequencies.

Figure 2:
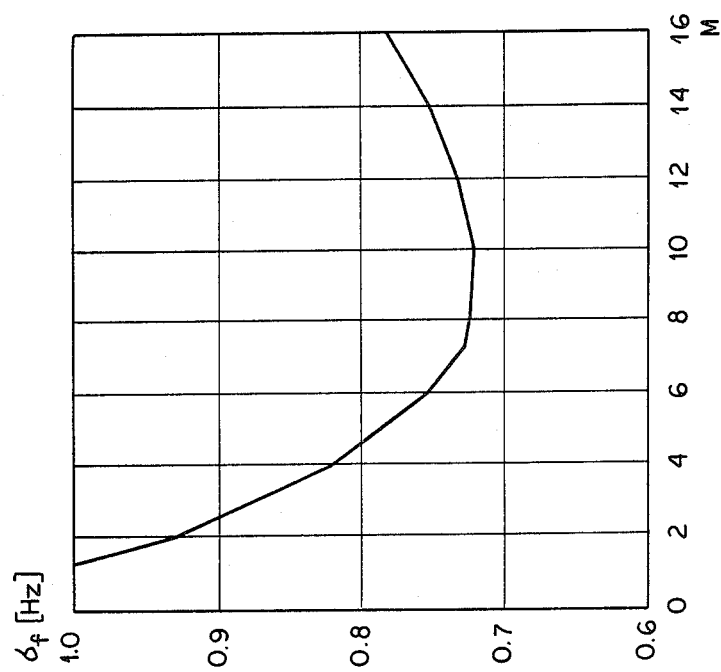

In FIG. 2 we have plotted the standard deviation $\sigma_f$ of the estimate $f_s$ from the true value of the scanning frequency in terms of the number M of lower-order and higher-order immediately adjoining terms used in accordance with equation (2) for determining the weighting coefficient $\delta$ introduced into equation (1). It will be noted that, in this statistical example, the deviation $\sigma_f$ drops below 1 Hz with $M = 1$ and reaches a minimum of about 0.72 Hz for $M = 10$, i.e. for 10 terms of index K−m and 10 terms of index K+m used in the calculation of the barycenter of the pulse amplitudes of the lower-order and of the higher-order terms. The graph of FIG. 2 is based on a signal-to-noise ratio of 2.56 dB and on a glint bandwidth (to a level of −3 dB) of 1 Hz.

A comparison of our present estimator with that of the passive "SERO" arrangement shows an improvement in performance by a factor of 1.3 to 2.5 and a reduction in size by a factor of 2 if a separate calculator 6 is used; when a computer already available in the system is employed for the evaluation of the digitized pulse amplitudes, the size reduction becomes even more significant by reaching a factor of 8. The reaction time in both instances is on the order of 2 seconds of which, in the present case, the aforementioned time of 0.85 sec is needed to provide the pulse sequence emitted by sampler 4. The number N of Fourier coefficients could be increased at both the upper and the lower end of the series to provide the additional coefficients required to calculate the weighting coefficient $\delta$ for very low or very high values of K.

The components of FIG. 1 can be integrated in a multilayer microcircuit controlling all the logical and data-processing operations described.

Though our invention has been particularly described for a countermeasure system designed to deactivate a tracking radar, it could be used for estimating the fundamental frequency of any basically periodic incident signal of somewhat erratic character.

We claim:

1. A device for estimating the operating frequency of a source of current incident signals lying within a predetermined frequency range, comprising:
   input circuitry for receiving an incident signal;
   filter means connected to said input circuitry for isolating an a-c component of said incident signal;

sampling means connected to said filter means for deriving a sequence of amplitude pulses of predetermined cadence, corresponding to twice the upper limit of the frequency range of the incident signal, from said a-c component;

conversion means connected to said sampling means for digitizing said amplitude pulses; and arithmetic means including an FFT analyzer, said arithmetic means being connected to said conversion means for subjecting the sequence of digitized amplitude pulses to a Fourier analysis and calculating an estimated operating frequency of said source from the index derived from selected terms in the resulting Fourier series having real and imaginary coefficients whose absolute values add up to a maximum numerical value in said series, said arithmetic means further including calculating means, connected to said FFT analyzer for weighting said index and means for deriving a corrective value from averaged differences between the Fourier coefficients of a limited number of terms preceding and succeeding said selected terms in said series connected to said calculating means for weighting said index with the corrective value as thus derived, said calculating means being also provided with means for summing the real and imaginary coefficients of at least a number of terms of said Fourier series and comparing the resulting sums for determining the selected terms from the highest sum of said series.

2. A device as defined in claim 1 wherein said amplitude pulses have a cadence $T_c$, the number of amplitude pulses in said sequence is N and the selected term has the index K, said calculating stage further having means for determining the estimated scanning frequency $\hat{f}_s$ according to the formula $$\hat{f}_s = \frac{K + \delta}{N \cdot T_c}$$

where $\delta$ is said corrective value.

3. A device as defined in claim 2 wherein $T_c$ is on the order of 600 Hz, N is substantially equal to $2^9$ pulses occurring in an interval of about 0.85 sec, and the number of terms of the Fourier series substantially equals n/2, said arithmetic means being constructed and arrayed to derive said correction value $\delta$ from approximately 10 terms immediately preceding and 10 terms immediately succeeding the selected terms.

4. A device as defined in claim 1, 2 or 3 wherein said input circuitry comprises a sample-and-hold circuit, said filter means comprising a low-pass filter downstream of said sample-and-hold circuit cutting off signal frequencies above said upper limit, a direct-current extractor in parallel with said low-pass filter, and a subtractor connected to the outputs of said low-pass filter and of said direct-current extractor.

* * * * *